Dec. 30, 1952  H. T. JOBE  2,623,260
PIPE MOLD
Filed March 27, 1951  2 SHEETS—SHEET 2

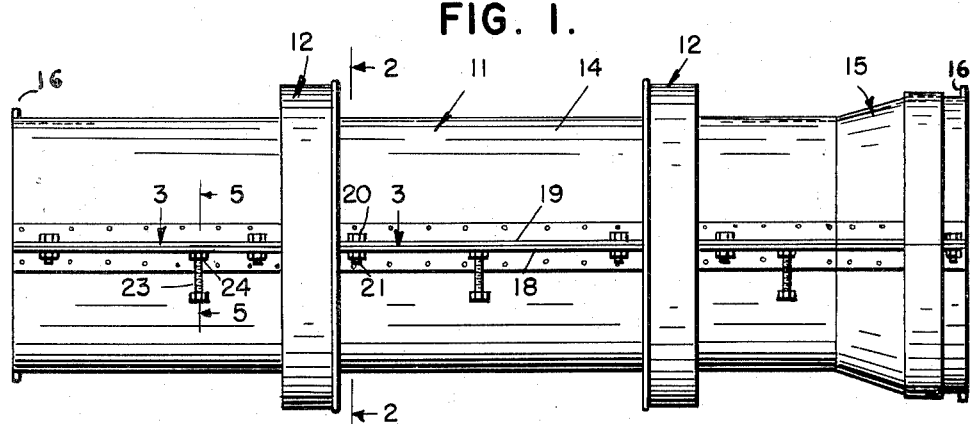
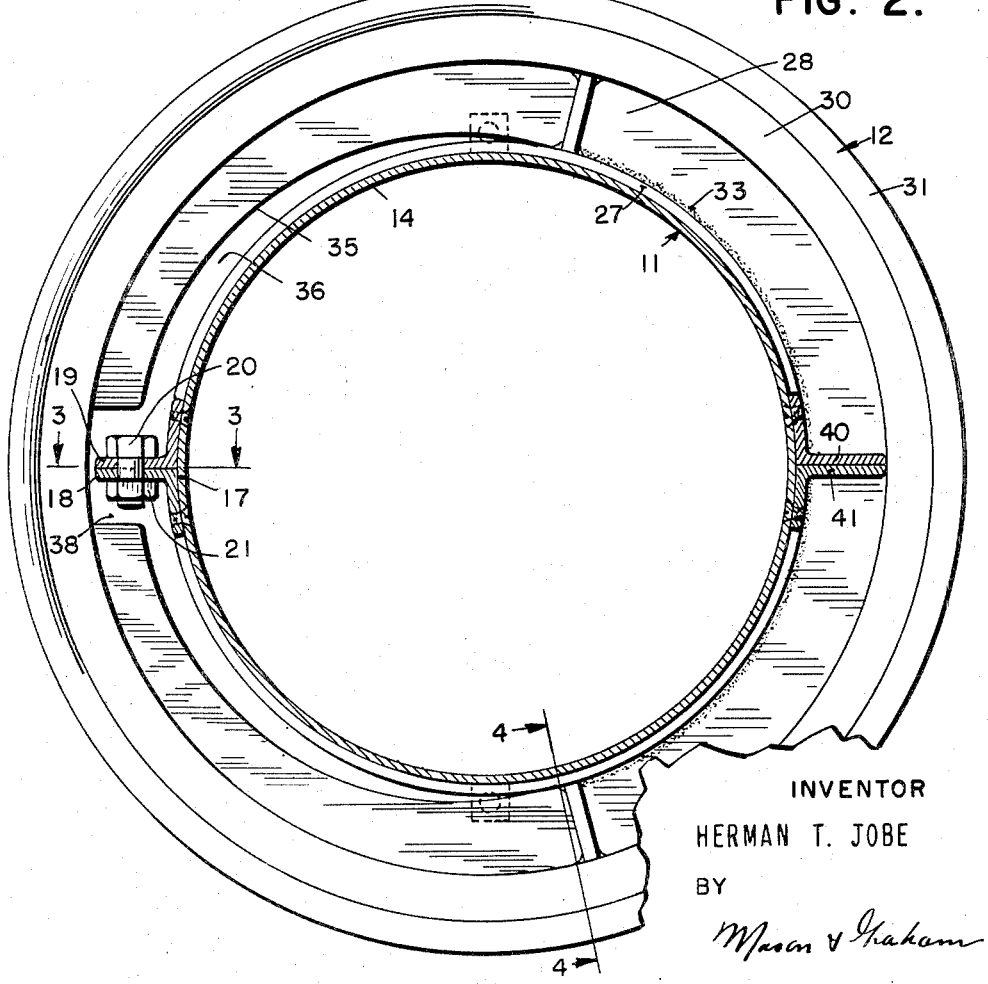

INVENTOR
HERMAN T. JOBE
BY
Mason & Graham
ATTORNEYS

Patented Dec. 30, 1952

2,623,260

UNITED STATES PATENT OFFICE 2,623,260

PIPE MOLD

Herman T. Jobe, Downey, Calif., assignor to American Pipe and Construction Co., a corporation of Delaware Application March 27, 1951, Serial No. 217,727

6 Claims. (Cl. 25—127)

This invention has to do with molds for forming concrete pipes and other products by centrifugal casting.

In the manufacture of concrete pipe and the like by the centrifugal-casting method a hollow tubular mold is rotated at a relatively high rate of speed supported on rollers or trunnions to compact concrete introduced into the mold. In order to provide a mold from which the finished pipe can be removed the molds heretofore have been made in two complementary sections which are bolted together or made from a single shell split longitudinally and bolted together. For the purpose of permitting the pipe mold to be spun on steel trunnions or rollers upon which the mold is supported in horizontal position it is necessary to provide the mold with runner rings which ride on the rollers. With the molds previously used the runner rings are slipped over the mold after the same is bolted together and anchored thereto by bolts. This has proved unsatisfactory because the rings cannot be firmly and evenly secured to the mold to prevent their becoming loose and vibrating relative to the mold shell under the load and stress imposed upon them as the mold is rotated. Also, since the mold must be opened to remove the completed pipe from the mold it is necessary to remove the runner rings from the mold each time a pipe is formed.

It is an object of this invention to provide a new and improved type of mold or pipe form for casting concrete pipe by the centrifugal method which does not have the above-noted disadvantages of presently used molds with the separate runner rings.

Another object is to provide a mold of the type indicated from which it is easy to remove the completed pipe. In this connection it is an object to provide a mold having a shell with a single longitudinal joint or split and to provide a mold in which the runner rings are integrally secured to the shell and are so formed as to permit of the expansion of the shell for the removal of the completed pipe from the mold.

A further object is to provide a mold of the type indicated which makes it possible to greatly reduce the time required to open the mold, remove the pipe, and close the mold.

These and other objects will be apparent from the drawings and the following description.

Referring to the drawings, which are illustrative of a preferred form of the invention:

Fig. 1 may be considered a side elevational view of a mold embodying the invention;

Fig. 2 is a cross-sectional view on a larger scale of the mold of Fig. 1 on line 2—2 of Fig. 1;

Figure 3:
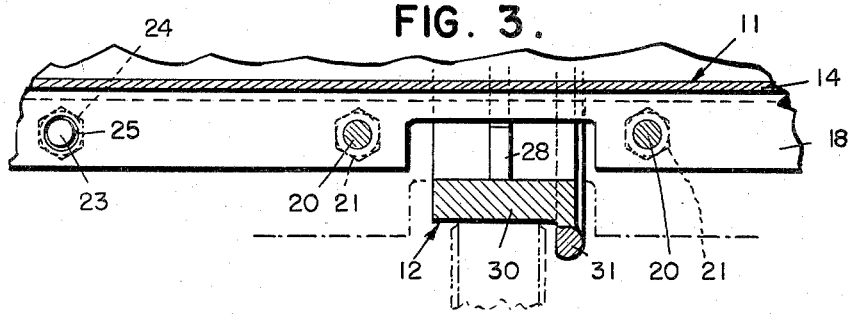
Fig. 3 is a fragmentary sectional view on line 3—3 of Fig. 1, the plane of the section also being indicated by line 3—3 on Fig. 2.
Figure 4:
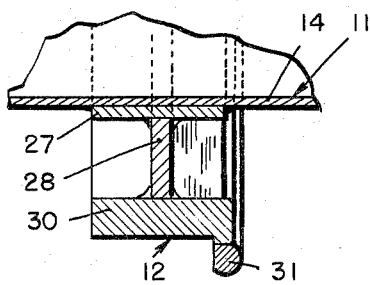
Fig. 4 is a fragmentary sectional view on line 4—4 of Fig. 2.
Figure 5:
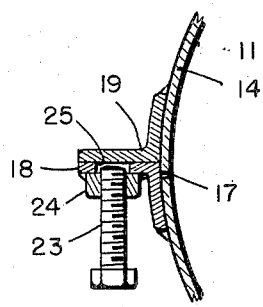
Fig. 5 is a fragmentary sectional view on a larger scale in the plane of line 5—5 of Fig. 1.

More particularly describing the invention, the mold comprises generally a shell 11 in which concrete is received and a pair of runner rings, generally indicated by 12. In the use of molds of this type, the mold is supported substantially horizontally upon trunnions or rollers, two of which are provided for each runner ring 12. One or more of the trunnions is driven to impart rotation to the mold. Since the apparatus for supporting the mold and the method of making pipe and other objects of concrete by the centrifugal-casting method are well known in the art, the apparatus has not been shown.

In the particular mold illustrated the shell 11 includes a cylindrical section 14 and beyond this at one end a bell or enlarged end section 15. The shell may be made of sheet steel. It is shown provided at each end with circumferentially spaced nuts 16 for use in bolting end rings or flanges to the ends of the shell for retaining concrete therein.

The shell is split longitudinally at 17 throughout its length. In the region of the split 17 the shell is provided with a pair of flanges, indicated by 18 and 19 which are provided with longitudinally spaced and registering sets of bolt holes for receiving bolts 20. These and nuts 21 are utilized for securing the mold in closed position as it is shown in the drawings. For the purpose of opening the mold the flange 18 is provided with a plurality of jack screws 23 spaced longitudinally along the flange and received in nuts 24 welded to the flange. Suitable openings 25 are provided so that the jack screws may be threaded through the flange 18 to abut the flange 19 and separate the two.

It is a particular feature of the invention that the runner rings 12 are integrally secured to or mounted on the shell 11. Radially inwardly of each runner ring the shell is provided with a backing band 27 which is welded to the shell. The runner rings each comprises a web 28, a rim 30 welded to the web throughout its circumference, and a flange 31 formed on or welded to the rim 30. The web 28 is welded to the backing band 27 throughout somewhat less than 180° of the circumference of the shell on the side thereof opposite the split 17 as best shown in Fig. 2 where the weld is indicated by numeral 33. Beyond the weld 33 the inner surface of the web is relieved, undercut or cut away on each side at 35, leaving a space 36 between the web and the shell. The web is less than 360° in length, leaving a space 38 in the regions of the flanges 18 and 19.

With the construction described it will be apparent that, when the bolts 20 securing the flanges 18 and 19 are removed, the shell 12 may be opened by expanding it within the runner rings (as by means of the jack screws 23) by reason of the spaces 36 and 38 provided between the web 28 and the shell.

I prefer to counterbalance the flanges 18 and 19 and associated bolt structure by suitably proportioned counterbalance flanges 40 and 41 (Fig. 2) secured to the shell on the side diametrically opposite flanges 18 and 19.

While I have illustrated and described a preferred form of my invention, I contemplate that various changes and modifications can be made without departing from the invention, the scope of which is indicated by the following claims.

I claim:

1. A symmetrically tubular mold, comprising an annular shell having a longitudinal split from end to end, means for securing the shell together along said split, and a pair of runner rings having circular peripheries spaced longitudinally of the shell, said rings each being secured to said shell for a substantial portion of their circumference in a region spaced circumferentially from said split, said rings being undercut in the region of said split and for a substantial distance circumferentially each way of said split thereby to provide space for the radial expansion of said shell for a substantial distance on each side of said split.

2. A symmetrically tubular mold, comprising an annular shell having a longitudinal split from end to end, means for securing the shell together along said split, and a pair of runner rings having circular peripheries spaced longitudinally of the shell, said rings each being welded to said shell for a substantial portion of their circumference in a region opposite said split, said rings being undercut in the region of said split and for a substantial distance circumferentially each way of said split thereby to provide space for the radial expansion of said shell for a substantial distance on each side of said split.

3. A symmetrically tubular mold, comprising an annular shell having a longitudinal split from end to end, means for securing the shell together along said split, and a pair of runner rings having circular peripheries spaced longitudinally of the shell, said rings each comprising a web extending around said shell and secured thereto in the region opposite said split for a substantial circumferential distance, and a circular rim integral with said web, said web being recessed on its inner surface in the region of said split and for a substantial distance on each side thereof providing a space between the web and said shell when said shell is secured together along said split whereby to permit of said shell being expanded within said web.

4. A mold as defined in claim 3 in which a backing band is provided on said shell between the shell and said web.

5. A symmetrically tubular mold, comprising an annular shell having a longitudinal split from end to end, means for securing the shell together along said split, and a pair of runner rings having circular peripheries spaced longitudinally of the shell, said rings each comprising a web extending around said shell and welded thereto in a region opposite said split for a distance circumferentially somewhat less than 180°, and a circular rim integral with said web, said web being recessed on its inner surface in the region of said split and for a substantial distance on each side thereof providing a space between the web and said shell when said shell is secured together along said split whereby to permit of said shell being expanded within said web.

6. In a construction of the type described, an inner, axially split annular member, means on said member for securing the same at said split, a ring encircling said annular member, and means securing said ring to said annular member in a region spaced circumferentially of said split, said ring being undercut in the region of said split and for a substantial distance circumferentially each way of said split thereby to provide space for the radial expansion of said annular member for a substantial distance on each side of said split.

HERMAN T. JOBE.

REFERENCES CITED

The following references are of record in the file of this patent:

UNITED STATES PATENTS

| Number | Name | Date |
|---|---|---|
| 937,178 | Rentzsch | Oct. 19, 1909 |

FOREIGN PATENTS

| Number | Country | Date |
|---|---|---|
| 102,907 | Australia | Jan. 20, 1938 |